United States Patent [19]

Bonaparte et al.

[11] 4,435,619
[45] Mar. 6, 1984

[54] SWITCHING NETWORK INTERFACING TELEPHONE-EXCHANGE EQUIPMENT WITH TWO-SUBSCRIBER PARTY LINE

[75] Inventors: Ennio Bonaparte, Seregno; Virgilio Mosca, Milan, both of Italy

[73] Assignee: Italtel Societa Italiana Telecomunicazioni S.p.A., Milan, Italy

[21] Appl. No.: 309,479

[22] Filed: Oct. 7, 1981

[30] Foreign Application Priority Data

Oct. 9, 1980 [IT] Italy ............................... 25213 A/80

[51] Int. Cl.³ .................... H04M 3/14; H04M 3/16
[52] U.S. Cl. .......................... 179/17 R; 179/17 B; 179/81 R; 179/27 E
[58] Field of Search .............. 179/17 R, 17 B, 81 R, 179/2 A, 18 B, 27 E, 27 G, 28, 30

[56] References Cited

U.S. PATENT DOCUMENTS 3,919,487 11/1975 Gabrielson ..................... 179/17 R
4,109,112 8/1978 Denman et al. ................. 179/17 R Primary Examiner—Stafford D. Schreyer
Attorney, Agent, or Firm—Karl F. Ross

[57] ABSTRACT

A line loop (a, b) serving two telephone subscribers with sets ($U_1$, $U_2$) each normally connected between ground and a respective line conductor, coupled at the exchange via a line transformer (T) to a voice path, includes a pair of line relays (RA, RB) respectively inserted in these conductors in series with two high-ohmic resistors ($RR_1'$, $RR_1''$) and two low-ohmic resistors ($RR_2'$, $RR_2''$) forming part of a switching network (CI) which interfaces the loop with call-control circuitry (CCT) at the exchange. Two selection relays ($RE_1$, $RE_2$) in the switching network normally connect the two line conductors to negative battery whereby an off-hook condition at one set, grounding the corresponding conductor, causes a current flow insufficient to operate the associated line relay but detectable by a line monitor ($RI_1$, $RI_2$) connected across the low-ohmic resistor thereof which generates an engagement signal ($i_1$, $i_2$) when that conductor is being addressed by a slow-rate scanning pulse ($u_1$, $u_2$). A resulting switchover of the exchange circuitry to fast-rate scanning energizes the respective selection relay and locks it operated to short-circuit the high-ohmic resistor, thereby actuating the corresponding line relay and disconnecting the other subscriber set from the loop. When the exchange detects a persisting off-hook condition in the absence of activity in an assigned time slot, it emits an isolating command (in) concurrently with the scanning pulse to set a flip-flop ($FF_1$, $FF_2$) causing the release of the selection relay.

14 Claims, 5 Drawing Figures

4,435,619

SWITCHING NETWORK INTERFACING TELEPHONE-EXCHANGE EQUIPMENT WITH TWO-SUBSCRIBER PARTY LINE

FIELD OF THE INVENTION

Our present invention relates to a switching network interfacing call-control equipment of a telephone exchange with a party line serving two subscriber sets, the line being a two-conductor loop each of whose conductors is normally connected to a respective set and includes a line relay having contacts which in an unoperated state of that line relay are closed to connect the respectively other conductor to the subscriber set associated therewith. As is customary in such systems, each subscriber set includes a hook switch which is operable to ground the associated conductor when the subscriber starts to make an outgoing call or responds to an incoming one; in the operated state of either line relay, the associated set is connected across the line loop to the exclusion of the opposite set.

BACKGROUND OF THE INVENTION

A problem with such a party line is the fact that, when one subscriber leaves the receiver off its hook or does not properly restore it after the termination or abortion of a call, the other subscriber is denied access to the line. The art knows various means enabling an exchange to recognize such an off-hook condition in the absence of activity on the associated line and to generate a command isolating that subscriber set in such a case in order to make the line available to the other subscriber.

OBJECTS OF THE INVENTION

An object of our present invention is to provide means facilitating such an isolation in a telephone system in which communication between subscribers takes place in recurrent time slots assigned to them.

Another object is to provide means in such a system for balancing a continuous line current in a transformer provided at the exchange for coupling such a loop to a voice path.

SUMMARY OF THE INVENTION

A switching network according to our invention, interfacing a two-conductor line loop with call-control circuitry at an exchange, comprises a line transformer having first and second subscriber-side windings respectively in series with a first and a second conductor of the line loop and further having an exchange-side winding connected across a voice path. First and second high-ohmic resistors as well as first and second low-ohmic resistors are respectively inserted in the first and second conductors in series with the corresponding subscriber-side windings. The operation of a hook switch by either of the two subscribers served by the line loop is detected by first and second line-monitoring means respectively connected across the corresponding low-ohmic resistors. These conductors are normally connected to a source of operating potential in an unoperated condition of respective first and second selection or "busy" relays whereby a grounding of either conductor by the hook switch of the associated set causes a current flow insufficient to operate the respective line relay but sufficient to be detected by the respective line-monitoring means for the emission of a respective engagement signal, namely a first engagement signal from the first line-monitoring means or a second engagement signal from the second line-monitoring means. The first and second line conductors are respectively addressed, at different instants, by first and second scanning pulses periodically emitted by the call-control circuitry of the exchange, these scanning pulses recurring normally at a relatively slow rate or cadence (e.g. every 312 milliseconds) but being accelerated to a relatively fast recurrence rate (e.g. every 125 microseconds) in response to a detected off-hook condition. Such acceleration is accompanied by the assignment of a time slot to the set found to be in off-hook condition for enabling its communication with the aforementioned voice path; the detection of the off-hook condition of a respective subscriber set is made possible by first and second gating means respectively responsive to the first and second scanning pulses for passing either the first engagement signal or the second engagement signal to the call-control circuitry. We further provide first and second holding means respectively connected between the first and second gating means and the first and second selection relays for operating either of these relays in response to a scanning of the respective engagement signal at the relatively fast rate, such operation short-circuiting the corresponding high-ohmic resistor with resulting intensification of current flow and operation of either the first or the second line relay as the case may be. When the exchange ascertains the existence of an off-hook condition in the absence of activity in a time slot assigned to the subscriber set found in that condition, its call-control circuitry emits an isolation command concurrently with a first or a second scanning pulse—depending on which set is off-hook—to activate first or second inhibiting means for blocking the first or the second gating means in the presence of the corresponding engagement signal, thereby restoring the respective selection relay to its unoperated condition with resulting release of the associated line relay.

The first and second holding means may comprise respective integrators inserted in energizing circuits of the associated selection relays.

The aforementioned inhibiting means may respectively comprise a first and a second flip-flop unblocking the associated gating means in a reset state, the first flip-flop being settable by the isolation command in the presence of a first scanning pulse and the first engagement signal, the second flip-flop being settable by such isolation command in the presence of a second scanning pulse and the second engagement signal. The two flip-flops are then resettable by the disappearance of the respective engagement signals.

According to a further feature of our invention, the switching network may comprise first and second timing means respectively triggerable by the associated gating means for preventing a resetting of the corresponding flip-flops, after a setting thereof, during a predetermined interval exceeding the release time of the associated line relays in order to prevent a premature termination of the isolation of the subscriber set found to be abnormally off-hook. Each timing means may comprise a first monostable circuit or monoflop trippable by a scanning pulse, with an off-normal period exceeding the recurrence period of the fast but not the slow scanning pulses, and a second monoflop trippable by another scanning pulse in the off-normal condition of the first monoflop in order to measure the aforementioned delay interval.

Pursuant to yet another feature of our invention, the switching network comprises a first and a second generator of direct current connected to auxiliary winding means of the line transformer, these generators being respectively operable under the control of the associated selection or "busy" relays to energize the auxiliary winding means with a biasing current of a polarity balancing a continous line current which traverses the loop conductors in the operated state of one or the other selection relay. These generators may respectively comprise a first and a second transistor with a base/emitter circuit connected across the corresponding low-ohmic resistor, the two transistors having collectors connected to opposite terminals of the auxiliary winding means. The generators may further include unidirectional conductive elements, preferably Zener diodes, connected in antiparallel relationship with the transistors thereof.

Still another feature of our invention resides in the use of opto-electronic couplers as the first and second line-monitoring means. Such an arrangement can also be used to detect the flow of line current, indicative of the response of a called subscriber, between call signals from a source of ringing current at the exchange whose call-control circuitry includes further relay means for switching either of the two loop conductors from the associated subscriber-side winding to that source via a respective branch lead in the presence of an incoming call addressed to the associated subscriber. A capacitor in this branch lead passes the ringing current and is shunted by resistance means traversed by direct current in an off-hook condition due to a response by the called subscriber; a d-c sensor connected across part of the resistance means may comprise a second opto-electronic coupler. The two couplers may be provided with a common output circuit connected across a d-c supply which is short-circuitable upon conduction of either coupler to generate the engagement signal also serving as an acknowledgment of the incoming call.

BRIEF DESCRIPTION OF THE DRAWING

The above and other features of our invention will now be described in detail with reference to the accompanying drawing in which.

Specific Description

Figure 1:
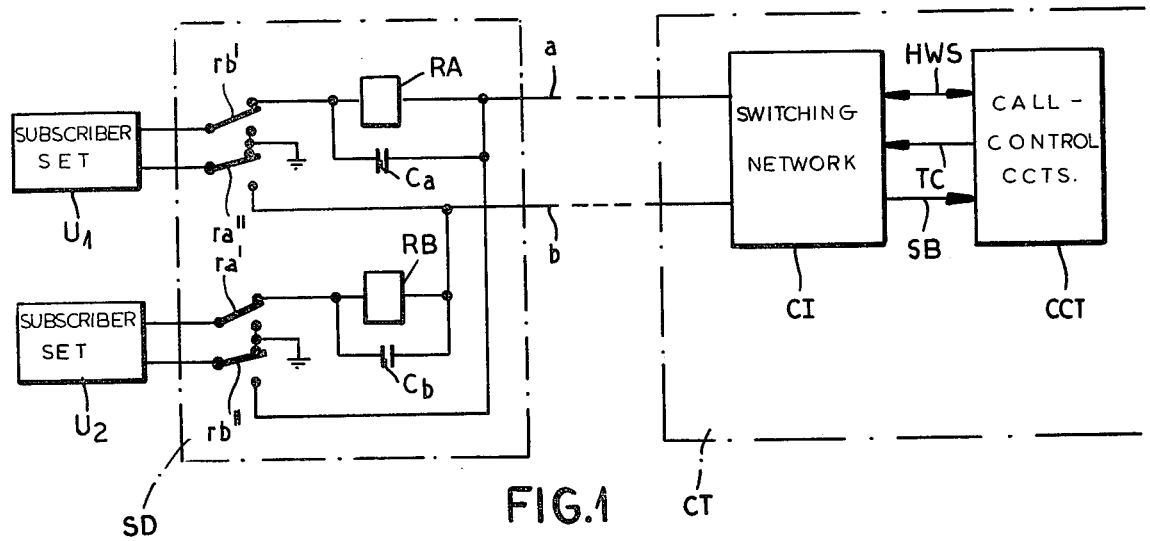
FIG. 1 is an overall block diagram showing a party line, shared by two subscribers, connected to an exchange which is provided with our improved switching network.

In FIG. 1 we have shown two subscriber sets $U_1$, $U_2$ each connected, in a quiescent state, to an associated conductor a, b of a line loop extending to a switching network CI in a telephone exchange CT also comprising call-control circuitry CCT. Network CI communicates with circuitry CCT via a two-way bus HWS, serving as a voice path, and receives timing and call signals as well as isolation commands from that circuitry by way of a bus TC while transmitting its own signals to circuitry CCT via a bus SB.

Also illustrated in FIG. 1 is a conventional party-line box SD with two line relays RA, RB whose windings, shunted by capacitors $C_a$ and $C_b$, are respectively inserted in conductors a and b. In the unoperated condition of line relay RA, an armature ra' thereof connects a lead of subscriber set $U_2$ via line relay RB to conductor b while another armature ra" grounds a lead of subscriber set $u_1$. Analogously, line relay RB has an armature rb' normally connecting a lead of set $U_1$ through relay RA to conductor a while another armature rb" grounds a lead of set $U_2$.

In conformity with common practice, the lifting of a telephone receiver of set $U_1$ closes a hook switch thereof to extend ground to conductor a whereby line relay RA is energized upon the short-circuiting of a high-ohmic resistor in line with this conductor at the exchange, as more fully described hereinafter; the operation of relay RA then connects set $U_1$ across loop a, b while disconnecting the set $U_2$ therefrom. Closure of the hook switch of set $U_2$, with line relay RA unoperated, has the analogous effect of connecting this set across the loop while disconnecting set $U_1$ therefrom as soon as another high-ohmic resistor in series with conductor b is short-circuited to bring on the relay RB.

Figure 2:
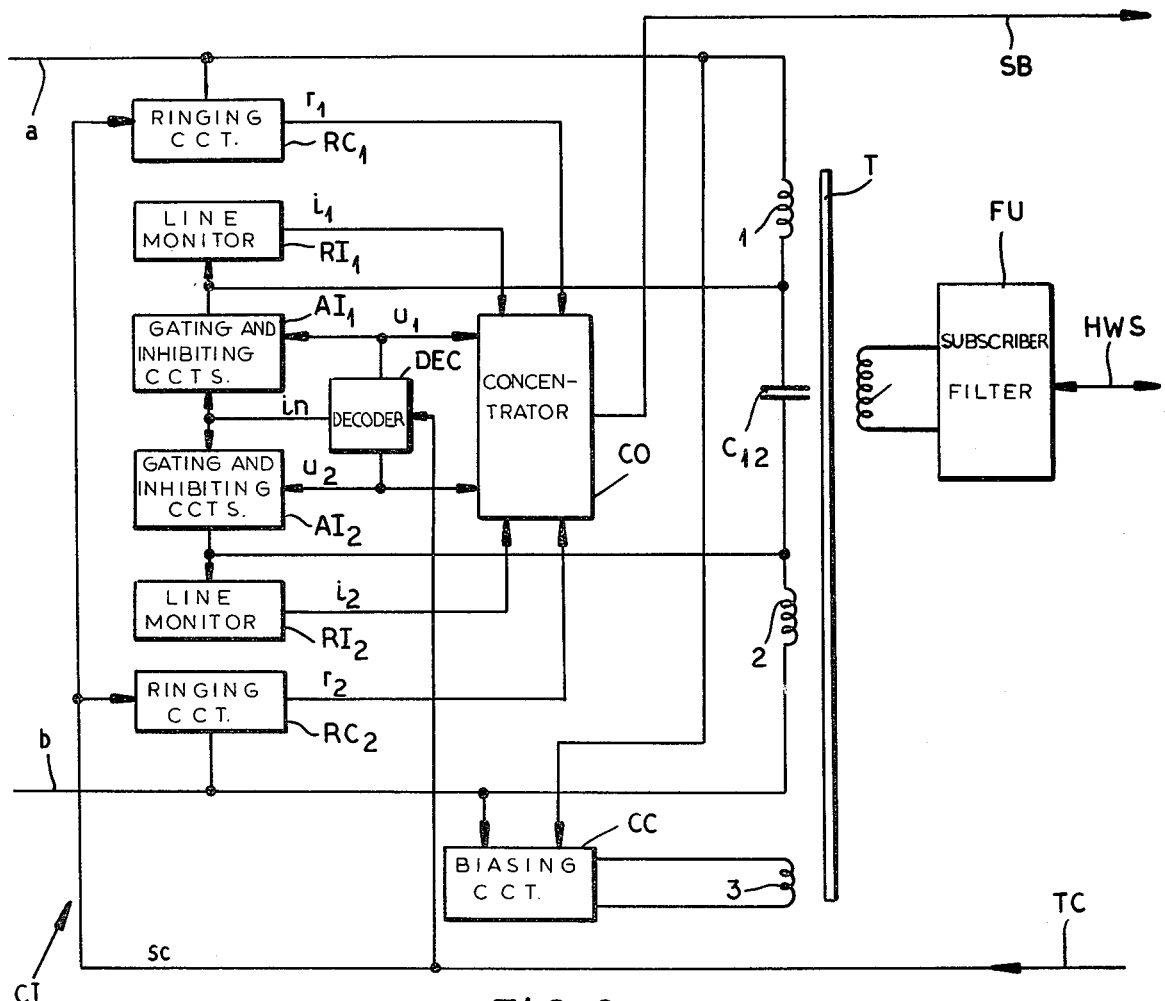
FIG. 2 is a block diagram showing details of the switching network of FIG. 1.

As shown in FIG. 2, the line loop is closed at the exchange for voice currents by way of two subscriber-side windings 1 and 2 interconnected by a capacitor $C_{12}$, these windings being part of a line transformer T with an exchange-side winding 4 connected to voice path HWS via a conventional subscriber filter FU. Switching network CI comprises two ringing circuits $RC_1$ and $RC_2$, respectively connected to branch leads of conductors a and b, which are responsive to a low-frequency call signal sc emitted via bus TC by circuitry CCT (FIG. 1) in the event of an incoming call. Conductors a and b are further connected, via the associated transformer windings 1 and 2, to respective line monitors $RI_1$ and $RI_2$. A decoder DEC, also having an input connected to bus TC, emits scanning pulses $u_1$ and $u_2$—respectively addressed to subscribers $U_1$ and $U_2$ of FIG. 1—to gating and inhibiting circuits $AI_1$, $AI_2$ as well as to a concentrator CO which further receives engagement signals $i_1$ and $i_2$ from line monitors $RI_1$, $RI_2$ as well as call-acknowledging signals $r_1$ and $r_2$ from ringing circuits $RC_1$, $RC_2$. With the circuit arrangement described hereinafter in connection with FIG. 4, acknowledgment signals $r_1$ and $r_2$ are identical with engagement signals $i_1$ and $i_2$, respectively. Decoder DEC also emits, under certain conditions described hereinafter, inhibiting commands coinciding with either of scanning pulses $u_1$ and $u_2$.

A further component of switching network CI is a biasing circuit CC with inputs connected to conductors a, b and with an output connection across an auxiliary winding 3 of line transformer T. The structure and operation of this biasing circuit will be described hereinafter with reference to FIG. 5.

Figure 3:
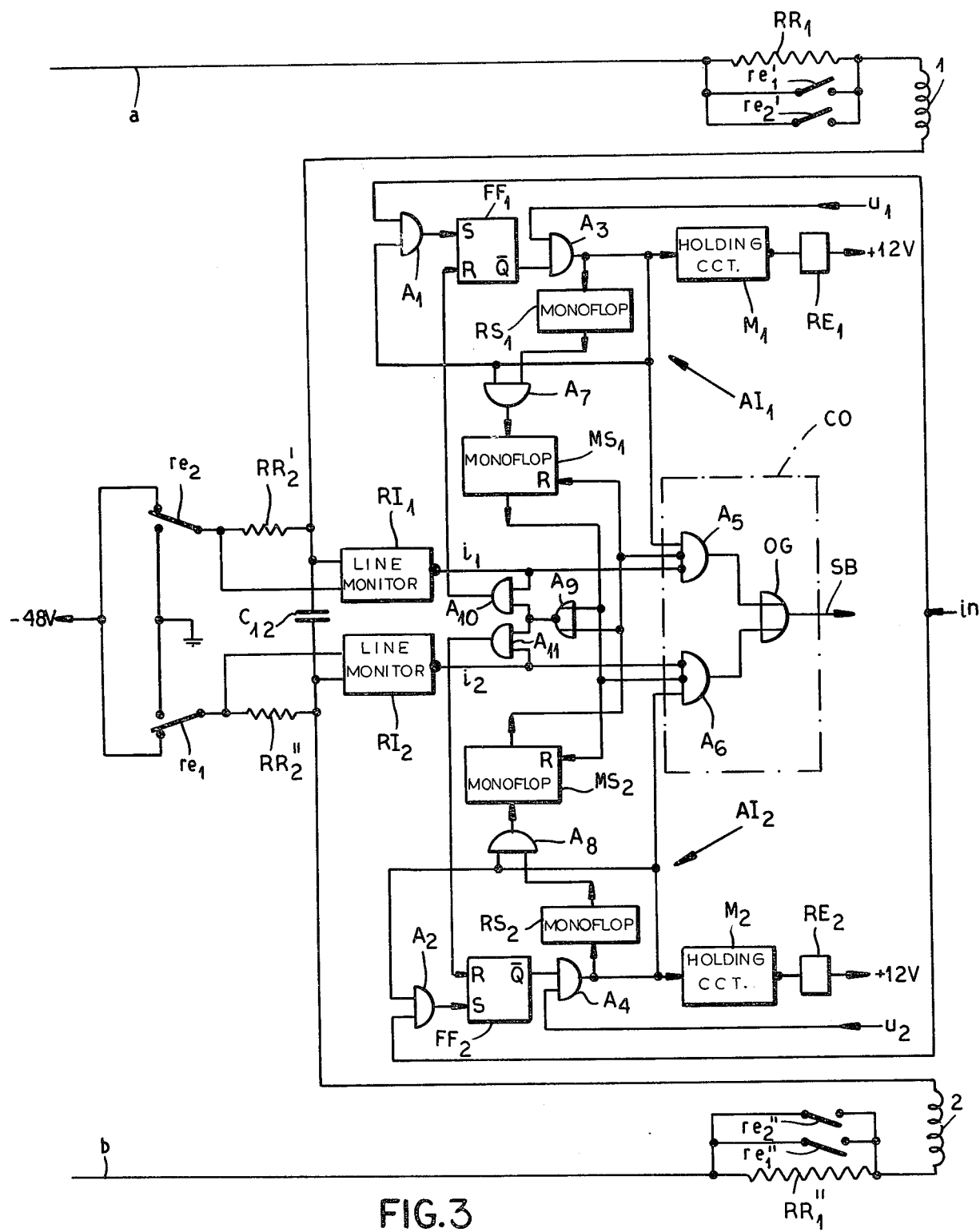
FIG. 3 is a circuit diagram more particularly illustrating certain components of the network of FIG. 2.

Network components $AI_1$, $AI_2$ and CO are more fully illustrated in FIG. 3 which shows conductors a and b normally connected, via respective armatures $re_2$ and $re_1$ of selection relays $RE_2$ and $RE_1$, to a source of operating voltage of −48 V in series with high-ohmic resistors $RR_1'$, $RR_1''$, transformer windings 1, 2 and low-ohmic resistors $RR_2'$, $RR_2''$. Normally open armature contacts $re_1'$, $re_1''$ and $re_2'$, $re_2''$ of selection or "busy" relays $RE_1$ and $RE_2$ lie in shunt with resistors $RR_1'$ and $RR_1''$, respectively. Thus, the operation of either selection relay short-circuits both high-ohmic resistors to intensify the flow of continuous line current through the loop from ground in box SD (FIG. 1) via a closed hook switch, conductor a or b, winding 1 or 2 and low-ohmic resistor $RR_2'$ or $RR_2''$ via a back contact of the unoperated selection relay to negative battery. This energizes the corresponding line relay RA or RB and results in the aforedescribed switchover whereby the ground of box SD is replaced by the grounding of the other conductor via armature $re_1$ or $re_2$.

Line monitors $RI_1$ and $RI_2$ are shown to have inputs respectively connected across low-ohmic resistors $RR_2'$ and $RR_2''$ while having inverted outputs generating the respective engagement signal $i_1$ or $i_2$ as a binary "0" in response to a voltage drop across the associated resistor. Signal $i_1$ is applied to an inverting input of an AND gate $A_5$ and a noninverting input of an AND gate $A_{10}$ while signal $i_2$ similarly goes to inverting and noninverting inputs of two AND gates $A_6$ and $A_{11}$. Gates $A_5$ and $A_6$, forming part of concentrator CO, work through an OR gate OG thereof into signal bus SB and have noninverting inputs connected to the outputs of respective AND gates $A_3$ and $A_4$. Gate $A_3$ has an input connected to the reset output $\overline{Q}$ of a flip-flop $FF_1$ with a setting input S connected to the output of an AND gate $A_1$ and with a resetting input R joined to the output of gate $A_{10}$; the other input of gate $A_3$ is tied to an output lead of decoder DEC (FIG. 2) carrying the scanning pulses $u_1$. In a completely analogous manner, gate $A_4$ has an input connected to a reset output $\overline{Q}$ of a flip-flop $FF_2$ with a setting input S energizable by an AND gate $A_2$ and a resetting input R connected to the output of gate $A_{11}$; the second input of gate $A_4$ receives the scanning pulses $u_2$ from the decoder. The output of gate $A_3$ is further connected, in parallel, to a holding circuit $M_1$ and to a trigger input of a monoflop $RS_1$ whose output terminates at an input of an AND gate $A_7$ which has another input connected, in parallel with one of gate $A_1$, to the output of gate $A_3$. Gate $A_7$ works into a trigger input of another monoflop $MS_1$ whose output is connected in parallel to an input of a NOR gate $A_9$, a further inverting input of AND gate $A_6$ and a resetting input R of a corresponding monoflop $MS_2$ in cascade with a monoflop $RS_2$ by way of an AND gate $A_8$ whose triggering input is tied to the output of gate $A_4$. The connections of monoflops $RS_2$ and $MS_2$ as well as gates $A_2$, $A_4$ and $A_8$ are analogous to those of monoflops $RS_1$ and $MS_1$ as well as gates $A_1$, $A_3$ and $A_7$, with gate $A_4$ also working into a holding circuit $M_2$ while the output of monoflop $MS_2$ extends to NOR gate $A_9$, a further inverting input of gate $A_5$ and a resetting input R of companion monoflop $MS_1$. NOR gate $A_9$ feeds two other inputs of AND gates $A_{10}$ and $A_{11}$. Finally, gates $A_1$ and $A_2$ have further inputs connected to the output of decoder DEC which carries the isolation commands in.

Scanning pulses $u_1$ and $u_2$ are periodically emitted by circuitry CCT (FIG. 1), with intervention of decoder DEC (FIG. 2), at a normal slow rate with a period of 312 msecs in an exchange assumed to serve 2,000 subscribers. With flip-flops $FF_1$ and $FF_2$ reset, these relatively staggered pulses reach the respective holding circuits $M_1$ and $M_2$ whose inverting outputs are connected to a source of operating voltage of +12 V via the windings of the respective selection relays $RE_1$ and $RE_2$. These holding circuits are designed as integrators whose time constant is short with reference to the aforementioned slow-scanning recurrence period whereby the associated selection relays $RE_1$ and $RE_2$ will remain unoperated. Monoflops $RS_1$ and $RS_2$, triggered by the trailing edges of the respective scanning pulses $u_1$ and $u_2$ passed by gates $A_7$ and $A_8$, have off-normal periods less than 312 msecs whereby gates $A_7$ and $A_8$ will remain cut off along with the second-stage monoflops $MS_1$ and $MS_2$. The off-normal periods of the latter monoflops exceed the release times of line relays RA and RB (FIG. 1) which, in some instances, might exceed 2 seconds.

When, say, line monitor $RI_1$ detects a voltage drop across resistor $RR_2'$ indicating closure of the hook switch of subscriber $U_1$, it emits the engagement signal $i_1$ of logical value "0" which blocks the gate $A_{10}$ but renders the gate $A_5$ conductive in the quiescent state of monoflop $MS_2$.

Gate $A_5$ transmits to circuitry CCT (FIG. 1) the engagement signal $i_1$ whereupon the exchange switches the pulses $u_1$ from their slow cadence to a fast rate with a recurrence period of 125 msecs. This recurrence period is less than the off-normal period of first-stage monoflop $RS_1$ whereby a pulse $u_1$, following the one which triggers this monoflop, will pass through gate $A_7$ to trigger the second-state monoflop $MS_1$. The latter, aside from blocking its mate $MS_2$ and AND gate $A_6$, also cuts off the NOR gate $A_9$ to prevent conduction of AND gates $A_{10}$ and $A_{11}$.

The rapidly recurring scanning pulses $u_1$, passing through gate $A_3$, now charge the holding circuit $M_1$ to a sufficient extent to let its output voltage go low whereby selection relay $RE_1$ is actuated and reverses its armature, with the aforedescribed result of connecting subscriber set $U_1$ across the loop a, b to the exclusion of set $U_2$ and with continued retransmission of pulses $u_1$ via gates $A_3$, $A_5$ and OG over bus SB to circuitry CCT. The exchange, in addition to accelerating the cadence of pulses $u_1$, also assigns to subscriber $U_1$ a time slot in which communication with another subscriber can be established. If, however, the exchange detects a lack of activity in the assigned time slot while the off-hook condition persists, it emits the isolation command in concurrently with a scanning pulse $u_1$ whereby gate $A_1$ becomes conductive and causes the setting of flip-flop $FF_1$. This blocks the gate $A_3$, prevents further triggering of monoflops $RS_1$ and $MS_1$, and causes the release of selection relay $RE_1$, thereby also reinserting the high-ohmic resistor $RR_1$ in conductor a with resulting deactivation of line relay RA (FIG. 1). The loop thus becomes accessible to subscriber $U_2$.

When subscriber $U_1$ subsequently reopens the hook switch, line monitor $RI_1$ recognizes the disappearance of the voltage drop across resistor $RR_1'$, and discontinues the engagement signal $i_1$. With monoflop $MS_1$ returned to normal, gate $A_{10}$ will conduct and reset the flip-flop $FF_1$ so as to terminate the isolation of this subscriber.

Immediately upon deactivation of selection relay $RE_1$ and prior to reversal of the contacts of line relay RA, however, both conductors a and b are connected to battery at $-48$ V so that current flow through resistor $RR_2'$ will be momentarily stopped and line monitor $RI_1$ will falsely detect a reopening of the hook switch. If gate $A_{10}$ were not cut off by monoflop $MS_1$ at this time, the exchange would have to intervene anew to re-isolate the subscriber $U_1$ after again noting the lack of activity in an assigned time slot following reoperation of "busy" relay $Re_1$. This inconvenience is obviated by the provision of gates $A_9$–$A_{11}$ together with timing means $RS_1$, $MS_1$ and $RS_2$, $MS_2$. The blocking of gate $A_6$ concurrently with the operation of relay $RE_1$ also prevents the futile transmission of engagement signal $i_2$ to circuitry CCT in the event that subscriber $U_2$ picks up the receiver during the time the line relay RA requires for completing the seizure of the loop by subscriber $U_1$.

Naturally, the system operates in an analogous manner in the case of an abnormal off-hook condition of subscriber set $U_2$.

Figure 4:
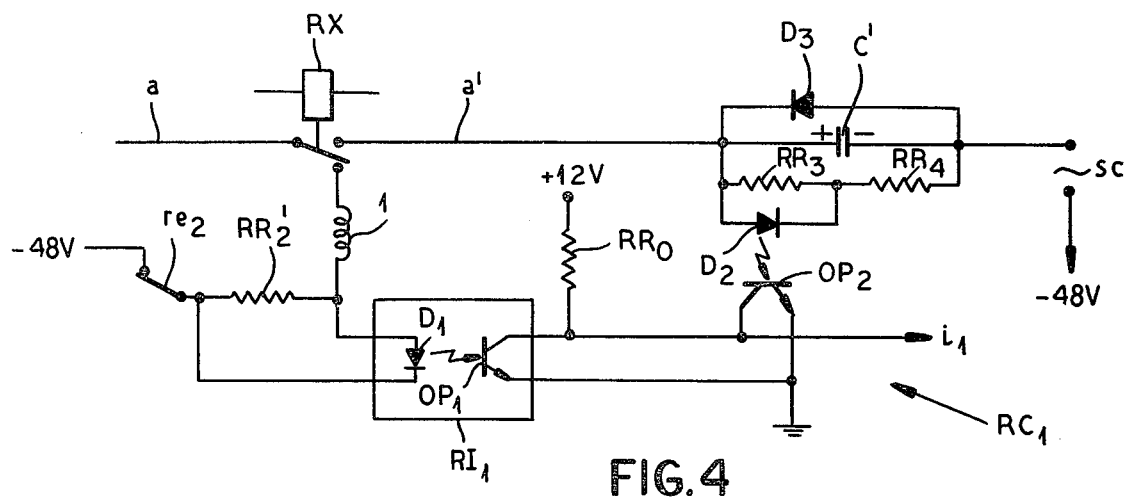
FIG. 4 is a circuit diagram detailing the ringing circuit.

FIG. 4 shows details of ringing circuit $RC_1$ which, of course, is also representative of its mate $RC_2$ (FIG. 2). In the event of an incoming call destined for subscriber $U_1$, a relay RX operated by the exchange—in a manner not further illustrated—attracts its armature to switch the conductor a from transformer winding 1 to a branch lead a' to which the call signal sc is applied in a manner well known in the art. This call signal may be a sinusoidal ringing current of 25 Hz, generated every 5 seconds for a one-second interval. The ringing current is passed by a capacitor C' in branch lead a' which is shunted by a pair of resistors $RR_3$, $RR_4$ acting as a voltage divider. Negative voltage of $-48$ V is blocked by a shunt diode $D_3$ but can traverse the resistors $RR_3$ and $RR_4$ in the operated state of relay RX when conductor a is grounded at set $U_1$ by closure of its hook switch. Line monitor $RI_1$, connected across low-ohmic resistor $RR_2'$, is shown to comprise an opto-electronic coupler including a light-emitting diode $D_1$ and a light-responsive transistor $OP_1$ with a grounded emitter and a collector connected to positive battery voltage of $+12$ V through a resistor $RR_0$. A similar opto-electronic coupler includes a light-emitting diode $D_2$ connected across resistor $RR_3$ and juxtaposed with a light-responsive transistor $OP_2$ whose collector and emitter are connected in parallel with those of transistor $OP_1$. The common collector lead of these two transistors, normally energized from the $+12$ V source, is grounded upon conduction of either transistor to generate the engagement signal $i_1$.

If the 25 Hz current constituting the call signal sc is continuously generated at the exchange, relay RX will be periodically operated to connect the conductor a to lead a' and to winding 1 for alternate periods of 1 and 5 seconds, respectively. When the called subscriber $U_1$ picks up during the 5-second interval, line monitor $RI_1$ responds to emit the engagement signal $i_1$. When, however, the hook switch is closed during energization of relay RX, that signal is generated by coupler $D_2$, $OP_2$. If signal sc is intermittently applied to lead a', relay RX can remain operated throughout the calling period whereby the engagement signal $i_1$, indicating the response of subscriber $U_1$, is produced only by the coupler $D_2$, $OP_2$.

Figure 5:
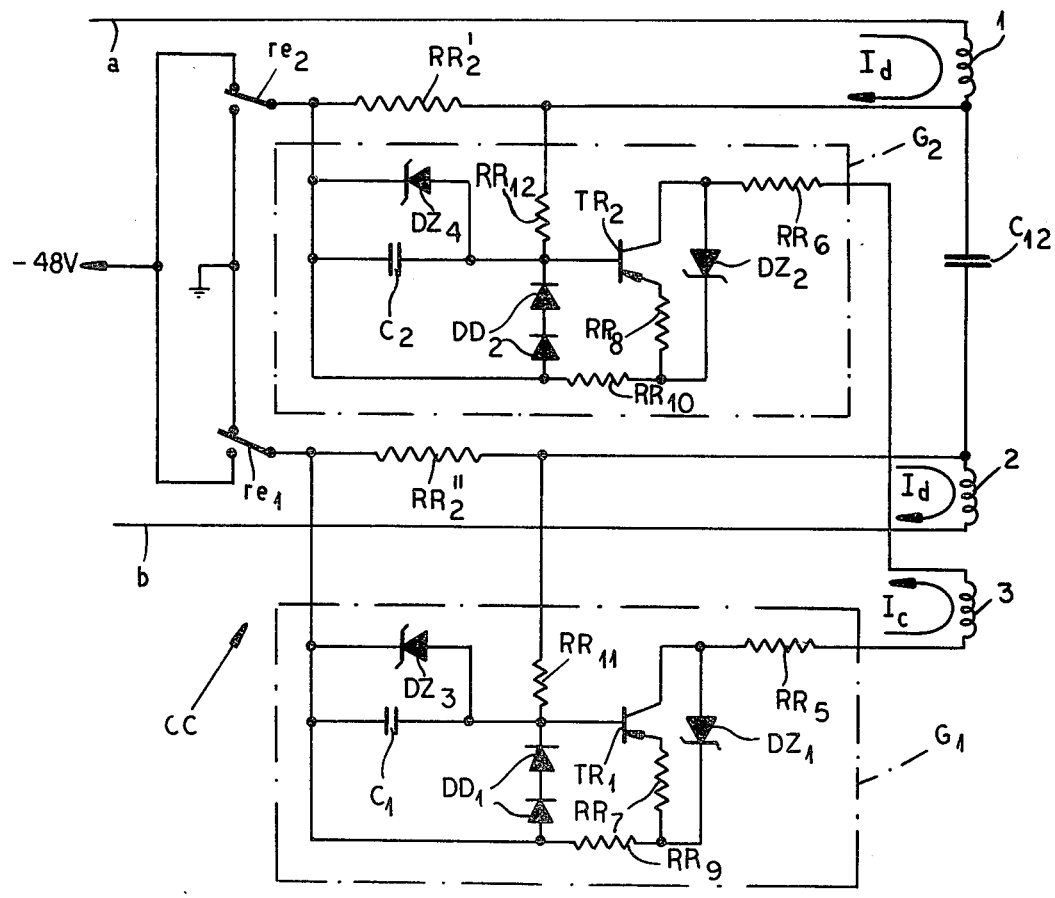
FIG. 5 is a circuit diagram detailing the bias circuit.

In FIG. 5 we have shown details of the biasing circuit CC which comprises two direct-current generators $G_1$, $G_2$ that are normally inactive. Biasing circuits of this general type are known, for example, from Italian Pat. No. 866,358. Generator $G_1$ includes a PNP transistor $TR_1$ inserted between auxiliary winding 3 and relay armature $re_1$ in series with a collector resistor $RR_5$ and another resistor $RR_9$, the emitter of transistor $TR_1$ being connected through a resistor $RR_7$ to the cathode of a Zener diode $DZ_1$ whose anode is tied to the collector of this transistor whereby the transistor and the Zener diode are disposed in antiparallel relationship between resistors $RR_5$ and $RR_9$. A stack of diodes $DD_1$ lies in series with resistors $RR_7$ and $RR_9$ between the emitter of transistor $TR_1$ and its base which is connected through a further resistor $RR_{11}$ to the junction of winding 2 with resistor $RR_2''$. Resistor $RR_{11}$ is connected across resistor $RR_2''$ in series with a capacitor $C_1$ which is shunted by another Zener diode $DZ_3$ opposing the flow of loop current $I_d$ in the event of seizure of the party line by subscriber $U_1$ (FIG. 1), i.e. with armature $re_1$ reversed as described above.

In a perfectly analogous manner, generator $G_2$ comprises a PNP transistor $TR_2$ connected, along with an emitter resistor $RR_8$, in antiparallel relationship with a Zener diode $DZ_2$ between resistors $RR_6$ and $RR_{10}$ in series with auxiliary winding 3; a stack of diodes $DD_2$, a further resistor $RR_{12}$, a capacitor $C_2$ and a Zener diode $DZ_4$ are connected across resistor $Rr_2'$, in a manner corresponding to that described for their counterparts in generator $G_1$.

In the illustrated position of relay armatures $re_1$ and $re_2$, representing closure of the hook switch of subscriber $U_1$, the flow of line current $I_d$ through windings 1 and 2 would have an undersirable loading effect upon line transformer T (FIG. 1) were it not counterbalanced by a compensating current $I_c$ emitted by generator $G_1$. This compensating current flows on account of the voltage drop across resistor $RR_2''$ which, aside from being detected by the associated line monitor (omitted in FIG. 5), renders transistor $TR_1$ conductive whereby current $I_c$ is caused to pass from ground via armature $re_1$ through resistors $RR_9$, $RR_7$, the emitter/collector path of transistor $TR_1$, resistor $RR_5$, winding 3, resistor $RR_6$ of generator $G_2$, Zener diode $DZ_2$, resistor $RR_{10}$ and armature $re_2$ to negative battery at $-48$ V. An opposite biasing current is produced by generator $G_2$ when the loop current is reversed in the alternate positions of relay armatures $re_1$ and $re_2$ upon seizure of the line by subscriber $U_2$.

Zener diodes $DZ_1$ and $DZ_2$, besides completing the current paths for their respectively opposite generators, also serve for protection of transistors $TR_1$ and $TR_2$ against transients, as do Zener diodes $DZ_3$ and $DZ_4$. Diode stacks $DD_1$ and $DD_2$ are designed to compensate for thermal drift. Capacitors $C_1$ and $C_2$ let the voice currents bypass these diode stacks so as to prevent untimely conduction of the two PNP transistors.

We claim:

1. In a telephone system wherein an electronic exchange communicates with two subscriber sets via a line loop with a first and a second conductor respectively including a first and a second line relay, each conductor being normally connected to an associated set via contacts closed in the unoperated state of the line relay in the other conductor, each set including a hook switch operable by the subscriber to ground the associated conductor, each line relay in an operated state connecting the associated set across said line loop to the exclusion of the opposite set, the combination therewith of a switching network interfacing said line loop with call-control circuitry at the exchange, said switching network comprising:

a line transformer having first and second subscriber-side windings respectively in series with said second conductors and further having an exchange-side winding connected across a voice path;

first and second high-ohmic resistors and first and second low-ohmic resistors in said first and second conductors in series with said first and second subscriber-side windings, respectively;

first and second line-monitoring means respectively connected across said first and second low-ohmic resistors;

first and second selection relays respectively connecting said first and second conductors to a source of operating potential in a normal unoperated condition thereof whereby a grounding of either of said conductors by the hook switch of the associated set causes a current flow insufficient to operate the respective line relay but sufficient to be detected by the respective line-monitoring means for the emission of a respective engagement signal;

first and second gating means responsive to first and second scanning pulses from said circuitry, respectively addressed to said first and second conductors, for alternatively passing a first engagement signal from said first line-monitoring means and a second engagement signal from said second line-monitoring means to said circuitry as an indication of an off-hook condition of the respective subscriber set, said scanning pulses being normally generated at a relatively slow recurrence rate but being accelerated by said circuitry to a relatively fast recurrence rate in response to said off-hook condition, such acceleration being accompanied by an assignment of a time slot for communication with said voice path to the set found to be in off-hook condition;

first and second holding means respectively connected between said first and second gating means and said first and second selection relays for respectively operating said selection relays in response to a scanning of the respective engagement signal at said relatively fast rate, operation of said first and second selection relays respectively short-circuiting said first and second high-ohmic resistors with resulting intensification of current flow and operation of said first and second line relays, respectively;

first inhibiting means responsive to an isolation command emitted by said circuitry concurrently with a first scanning pulse for blocking said first gating means in the presence of said first engagement signal and in the absence of activity in a time slot assigned to said first conductor, thereby restoring said first selection relay to its unoperated condition with resulting release of said first line relay; and second inhibiting means responsive to an isolation command emitted by said circuitry concurrently with a second scanning pulse for blocking said second gating means in the presence of said second engagement signal and in the absence of activity in the time slot assigned to said second conductor, thereby restoring said second selection relay to its unoperated condition with resulting release of said second line relay.

2. The combination defined in claim 1 wherein said first and second holding means comprise integrators inserted in energizing circuits for said first and second selection relays, respectively.

3. The combination defined in claim 1 wherein said first and second inhibiting means comprise a first and a second flip-flop respectively unblocking said first and second gating means in a reset state, said first flip-flop being settable by said isolation command in the presence of a first scanning pulse and said first engagement signal, said second flip-flop being settable by said isolation command in the presence of a second scanning pulse and said second engagement signal.

4. The combination defined in claim 3 wherein said first and second flip-flops are resettable by the disappearance of said first and second engagement signals, respectively.

5. The combination defined in claim 4 wherein said switching network further comprises first and second timing means respectively triggerable by said first and second gating means for respectively preventing a resetting of said first and second flip-flops after a setting thereof during a predetermined delay interval exceeding the release time of the associated line relay.

6. The combination defined in claim 5 wherein each of said timing means comprises a first monoflop trippable by a scanning pulse, with an off-normal period exceeding the recurrence period of said scanning pulses at said fast rate but not at said slow rate, and a second monoflop trippable by another scanning pulse in the off-normal condition of said first monoflop to measure said delay interval.

7. The combination defined in claim 1 wherein said switching network further comprises a first and a second generator of direct current, said line transformer being provided with auxiliary winding means connected to said generators for respective energization thereby under the control of said first and second selection relays with a biasing current of a polarity balancing a continuous line current traversing said conductors.

8. The combination defined in claim 7 wherein said first and second generators comprise a first and a second transistor with base/emitter circuits respectively connected across said second and first low-ohmic resistors and with collectors connected to opposite terminals of said auxiliary winding means.

9. The combination defined in claim 8 wherein said generators further include unidirectionally conductive elements connected in antiparallel relationship with the transistors thereof.

10. The combination defined in claim 9 wherein said unidirectionally conductive elements are Zener diodes.

11. The combination defined in claim 1 wherein said first and second line-monitoring means comprise opto-electronic couplers.

12. The combination defined in claim 1 wherein said circuitry includes a source of ringing current and further relay means for switching either of said conductors from the associated subscriber-side winding to said source via a respective branch lead in the presence of an incoming call addressed to the associated subscriber, said branch lead including a capacitor passing said ringing current and resistance means in shunt with said capacitor traversed by direct current in an off-hook condition due to a response by the called subscriber, said first and second line-monitoring means each including a direct-current sensor coupled to said resistance means of the respective branch lead.

13. The combination defined in claim 12 wherein said first and second line-monitoring means each comprises a first and a second opto-electronic coupler respectively connected across the associated low-ohmic resistor and part of the resistance means of the associated branch lead, said second coupler constituting said direct-current sensor.

14. The combination defined in claim 13 wherein said couplers are provided with a common output circuit connected across a direct-current supply short-circuitable upon conduction of either of said couplers.

* * * * *